(12) United States Patent
Seewald et al.

(10) Patent No.: US 9,655,171 B2
(45) Date of Patent: May 16, 2017

(54) HEATER

(71) Applicants: MAHLE International, Stuttgart (DE); Behr-Hella Thermocontrol GmbH, Lippstadt (DE)

(72) Inventors: Wolfgang Seewald, Tamm (DE); Karl-Gerd Krumbach, Burgstetten (DE); Michael Kohl, Bietigheim-Bissingen (DE); Matthias Stallein, Rietberg (DE); Lars Heeper, Paderborn (DE); Karsten Marquas, Arnsberg (DE)

(73) Assignees: MAHLE International GmbH, Stuttgart (DE); Behr-Hella Thermocontrol GmbH, Lippstadt (DE)

( * ) Notice: Subject to any disclaimer, the term of this patent is extended or adjusted under 35 U.S.C. 154(b) by 425 days.

(21) Appl. No.: 14/306,982

(22) Filed: Jun. 17, 2014

(65) Prior Publication Data
US 2014/0374409 A1   Dec. 25, 2014

(30) Foreign Application Priority Data
Jun. 19, 2013  (DE) .................... 10 2013 211 581

(51) Int. Cl.
 *H05B 6/10* (2006.01)
 *H05B 6/36* (2006.01)
 (Continued)

(52) U.S. Cl.
 CPC ........... *H05B 6/108* (2013.01); *B60H 1/2221* (2013.01); *F24H 3/0429* (2013.01);
 (Continued)

(58) Field of Classification Search
 CPC .... H05B 6/105; H05B 6/36; H05B 2206/024; H05B 6/108; F24H 3/0429; F24H 9/0063; B60H 1/2221
 (Continued)

(56) References Cited

U.S. PATENT DOCUMENTS 5,216,215 A * 6/1993 Walker ................... H05B 6/108
                                                   219/630
5,990,465 A   11/1999 Nakaoka et al.
(Continued)

FOREIGN PATENT DOCUMENTS

DE       10 54 191 B      4/1959
DE       18 55 170 U      7/1962
(Continued)

*Primary Examiner* — Christopher Kim
(74) *Attorney, Agent, or Firm* — Muncy, Geissler, Olds & Lowe, P.C.

(57) ABSTRACT

A heater with a housing with a fluid channel, disposed therein, with a fluid inlet and a fluid outlet, whereby a coil, which generates an alternating magnetic field and is separated sealed from the fluid channel by a coil housing, is provided in the housing, whereby furthermore at least one metallic flat heating element is provided, which can be heated by the alternating magnetic field. The at least one flat heating element is disposed in the fluid channel, whereby the fluid channel is divided at least into a first channel and a second channel. Walls bounding the channels are formed by the coil housing and/or by a flat heating element.

17 Claims, 4 Drawing Sheets

(51) Int. Cl.
*F24H 3/04* (2006.01)
*F24H 9/00* (2006.01)
*B60H 1/22* (2006.01)

(52) U.S. Cl.
CPC ............ *F24H 9/0063* (2013.01); *H05B 6/36* (2013.01); *H05B 2206/024* (2013.01)

(58) Field of Classification Search
USPC ................ 219/628–631, 661, 667, 672, 674; 392/397, 398
See application file for complete search history.

(56) References Cited

U.S. PATENT DOCUMENTS

| | | |
|---|---|---|
| 2003/0215226 A1 | 11/2003 | Nomura et al. |
| 2008/0011336 A1 | 1/2008 | Hamaguchi |
| 2010/0132921 A1 | 6/2010 | Moskal et al. |
| 2010/0213190 A1 | 8/2010 | Bron et al. |
| 2014/0027444 A1 | 1/2014 | Kohl et al. |
| 2014/0374408 A1* | 12/2014 | Seewald ................ H05B 6/108 219/629 |

FOREIGN PATENT DOCUMENTS

| | | |
|---|---|---|
| DE | 20 03 133 A | 7/1971 |
| DE | 33 09 297 A1 | 9/1984 |
| DE | 10 2008 056 991 A1 | 5/2010 |
| DE | 10 2008 044 280 A1 | 6/2010 |
| EP | 1 280 382 A2 | 1/2003 |
| EP | 2 689 046 A1 | 1/2014 |
| GB | 755 570 A | 8/1956 |
| GB | 787 125 A | 12/1957 |
| WO | WO 2009/050631 A1 | 4/2009 |
| WO | WO 2009/130761 A1 | 10/2009 |

* cited by examiner

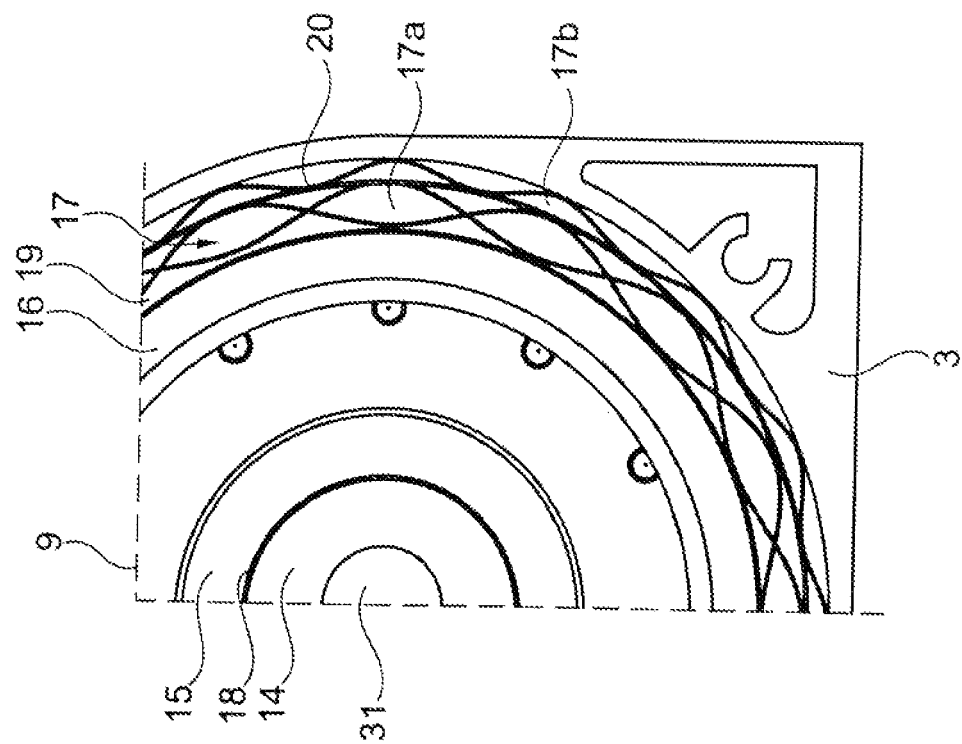
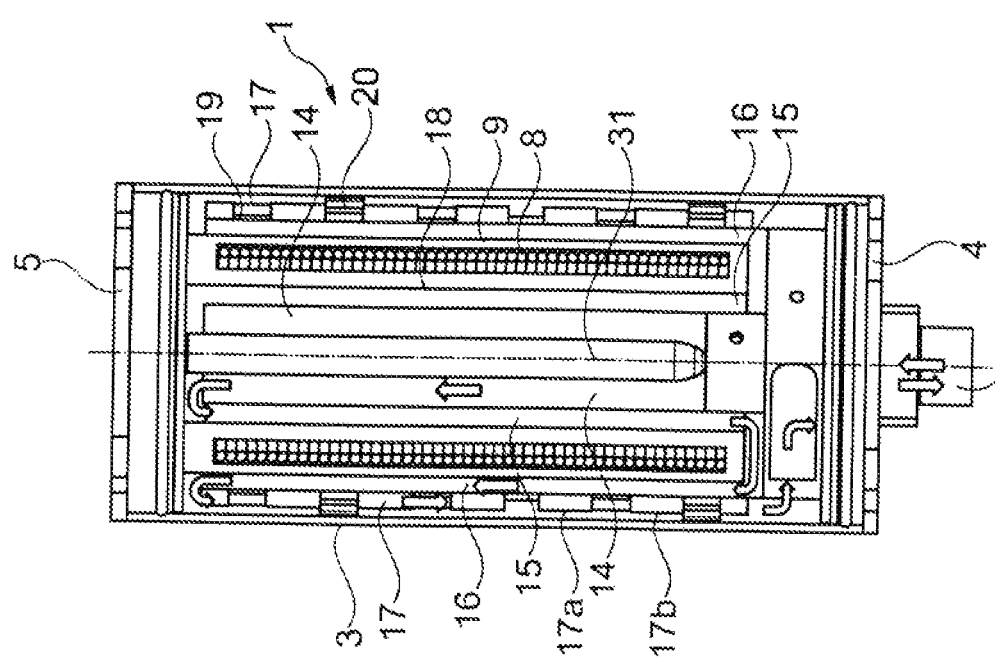

HEATER

This nonprovisional application claims priority under 35 U.S.C. §119(a) to German Patent Application No. 10 2013 211 581.4, which was filed in Germany on Jun. 19, 2013, and which is herein incorporated by reference.

BACKGROUND OF THE INVENTION

Field of the Invention

The invention relates to a heater with a housing with a fluid channel, disposed therein, with a fluid inlet and a fluid outlet, whereby a coil which generates an alternating magnetic field and is separated sealed from the fluid channel by a coil housing, is provided in the housing, whereby at least one metallic flat heating element is provided, which can be heated by the alternating magnetic field, whereby the at least one flat heating element is disposed in the fluid channel.

Description of the Background Art

Additional heaters, which provide heat to the interior independent of the heat output supplied by the internal combustion engine or in addition to it, are increasingly needed for heating vehicles, particularly in vehicles with low-consumption internal combustion engines or in hybrid vehicles.

Electrically powered heaters have proven especially practical in this case. These provide the necessary heat rapidly and can be dimensioned as especially space-saving. So-called high-voltage heaters, which can be operated at a voltage of over 300 volts, are suitable in particular for use in hybrid vehicles.

Heaters are known from the conventional art. Thus, there are air-side heaters, which have so-called PTC heating elements, which are supplied with electric current and are heated thereby. The heat is transferred to the circulating air via air-side ribs, which are in contact with the PTC elements. These heaters, however, have a basically different structure than is necessary for liquid media.

Heaters for liquid media are provided with a closed housing, which are formed with a fluid channel with a fluid inlet and a fluid outlet, whereby a heating element heated with a PTC element projects into the housing.

The heaters for liquid media have the disadvantage that the heat is produced in a region different from the fluid channel through which the liquid medium to be heated flows. As a result, because of the present transfer resistances a delayed heating is achieved, which is to be regarded as disadvantageous.

The disadvantage of the solutions in the conventional art in particular is that the efficiency of known heaters is low and the structure is very complex.

SUMMARY OF THE INVENTION

It is therefore an object of the present invention to provide a heater suitable for heating a fluid rapidly and cost-effectively, whereby the heating occurs directly in the fluid to be heated.

An exemplary embodiment of the invention relates to a heater with a housing with a fluid channel, disposed therein, with a fluid inlet and a fluid outlet, whereby a coil which generates an alternating magnetic field and is separated sealed from the fluid channel by a coil housing, is provided in the housing, whereby at least one metallic flat heating element is provided, which can be heated by the alternating magnetic field, whereby the at least one flat heating element is disposed in the fluid channel, whereby the fluid channel is divided at least into a first channel and a second channel, whereby the walls bounding the channels are formed by the coil housing and/or by a flat heating element.

The alternating magnetic field in this case can be generated by one or more current-carrying coils. The coil induces eddy currents in the so-called flat heating elements. The flat heating elements are advantageously made of a metallic material and can be adapted in their shape to the particular heater. The eddy currents in the flat heating elements result in the heating of said elements and therefore in the heating of a fluid flowing past the flat heating elements.

The coils can be advantageously accommodated in a housing, which is made of an electrically non-conductive material such as, for example, plastic. The coil can be wound singly or multiply, particularly twice. The coil embedded and/or encapsulated in the coil housing is located directly in the fluid flow to be heated within the heater. Thus, the waste heat from the coil can be introduced directly into the fluid to be heated and at the same time the coil is cooled directly by the fluid flow.

The fluid can flow around the flat heating elements, located in the fluid flow, on one or both sides. Advantageously, the material of the flat heating elements has a much higher electrical resistivity than the highly conductive copper of the induction coil, which advantageously is a high-frequency copper. This promotes a high efficiency for the conversion of the electromagnetic energy into thermal energy.

Therefore the induction coil in its coil housing and the metallic flat heating elements are disposed within the housing.

By the described invention, the high-voltage in the coil can be separated from the fluid flow in the heater by the contactless transfer of energy to the fluid.

The outer geometry of the heater can be configured cylindrical or flat, for example. In the cylindrical form, the coil is wound as a cylindrical coil and the heating sheet is made as a tube. In the flat form, the coil is wound flat and the heating sheet is made as a planar sheet and arranged adjacent to the coil.

In an exemplary embodiment of the invention, it can be provided that the fluid channel and/or the channels of the fluid channel are formed ring-shaped and the coil housing and/or the flat heating element are formed as a hollow cylinder and have diameters different from one another and are inserted in one another.

The flat heating elements in this case can be disposed, for example, radially within and/or radially outside the coil. Because of the spread of the alternating magnetic field, the field strength radially within the coil is greater than radially outside the coil.

The flat heating element and/or the coil and/or the coil housing can be disposed concentrically to one another. This is especially advantageous in order for the individual arising channels to be designed advantageously.

Further, at least one flat heating element can be disposed radially within the coil and/or at least one flat heating element can be disposed radially outside the coil.

This will allow for the arising alternating magnetic field to be utilized especially advantageously, because it radiates both radially inward and radially outward from the coil.

It is also expedient if a fluid flows in a co-current flow or countercurrent flow in channels adjacent to one another.

Depending on the design of the individual channels and the fluid transitions between the channels, a through flow in a co-current flow or countercurrent flow can result advantageously.

It is advantageous, moreover, if at least one flat heating element is made of a magnetic material.

The spreading of the alternating magnetic field can be contained by a magnetic material. An unintended effect of the alternating magnetic field on adjacent structures and elements can thereby be lessened or completely prevented.

Also, at least one flat heating element can be inserted in one of the channels, whereby the particular channel can be divided into two subchannels by the flat heating element.

In this way, the hydraulic diameter of the particular channel can be adjusted; in addition, the flow pattern within the channel can be influenced.

It is also advantageous, if a co-current flow flows around the flat heating element dividing the channel into the two subchannels.

A flat heating element and/or the coil housing at one of the surfaces around which the fluid flows can have swirl elements and/or turbulence elements.

The flow pattern within the channels can be improved in this way. In particular, better mixing and thereby a greater temperature homogenization can be achieved.

According to an embodiment of the invention, it can be provided that a flat heating element can be made of a material that has a higher resistivity compared with the material of the coil.

A material with a higher resistivity than the coil generating the alternating magnetic field is especially advantageous to generate the greatest possible heating of the flat heating elements. This increases the efficiency of the entire heater. Especially advantageous in this case is a material thickness of the flat heating elements of about 0.08 mm to 0.5 mm.

Also, at least one flat heating element can have at least one opening through which a fluid transfer between channels adjacent to one another is realizable.

As a result, the fluid flow can be improved and a more uniform distribution of the fluid achieved.

It is also expedient, if an element for regulating the hydraulic diameter of the channel can be inserted at least in one of the channels.

Both the hydraulic diameter and the flow guidance within a channel can be advantageously adjusted via the element. An example of such an element is a mandrel, which can be inserted in one of the channels.

A temperature sensor can be disposed within and/or outside the coil housing.

The temperatures of the different elements can be acquired advantageously via a temperature sensor. For example, the temperature of the coil or of the fluid at different locations in the heater can be acquired. Especially advantageously, a temperature sensor is integrated in an element, which was inserted in the heater to adjust the hydraulic diameter of a channel of the fluid channel.

A pressure loss in channels adjacent to one another can increase or decrease with an increasing flow path length within the heater.

To assure that during the transfer from one channel to the next channel the fluid is uniformly distributed in the particular channel, the fluid-side pressure loss should increase slightly from channel to channel.

In addition, the fluid-side pressure loss of the entire heater should be as low as possible, so that the lowest possible pump output of the electrical fluid pump can be realized.

The most optimal adjustment of the channels within the fluid channel also increases the heat output. The reason for this being that the flow rate and thereby the heat transfer from the flat heat elements to the fluid can be positively influenced. A completely homogeneous supplying of the channels or the fluid channel with the fluid can also be achieved.

In an embodiment, the pressure loss in channels adjacent to one another can increase continuously with an increasing flow path length within the heater.

In an alternative embodiment, it can be provided that a first flat heating element, a second flat heating element, and a third flat heating element are provided, whereby the fluid channel is divided by the flat heating elements into a first channel, a second channel, a third channel, and a fourth channel, whereby one of the channels can be divided into two subchannels by the third flat heating element.

An arrangement of a plurality of flat heating elements is especially advantageous, because the overall heat output of the heater can thereby be increased. An optimization of the heater depending on the field strength of the alternating magnetic field can be achieved by adjusting the distances of the individual flat heating elements to one another.

The first flat heating element can be disposed radially within the coil and the second flat heating element and the third flat heating element are disposed radially outside the coil.

The heat output of the heater can be adjusted by adjusting the frequency of the operating voltage. This is especially advantageous if different voltage levels are to be used in the operating voltage.

The flat heating elements can be structured and/or have a wave shape.

Such a design of the flat heating elements can be especially advantageous to increase the overall heat output of the heater.

In an embodiment, a fluid can flow around the flat heating element on one or both sides.

The flat heating element can be in direct contact with the fluid flowing through the fluid channel. This achieves a good and rapid heating of the fluid.

In an embodiment, a fluid can flow around the flat heating element on both sides, whereby the flow direction of the fluid on the one side of the flat heating element is the same or opposite to the flow direction on the other side of the flat heating element. As a result, the fluid is passed serially first past the one side and then the other side of the flat heating element. This increases the effectiveness of the heating.

An exemplary embodiment has an end element generating an alternating magnetic field that is a substantially planar element and/or a hollow cylindrical element.

The flat heating element can be a substantially planar element and/or a hollow cylindrical element.

An element generating an alternating magnetic field can be a substantially planar coil and/or a hollow cylindrical coil.

A control unit can be connected to the housing or integrated into it.

The housing can have of a magnetic field-absorbing material or a material transparent to alternating magnetic fields.

The coil housing can have a magnetic field-transparent material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows a further sectional view of a heater of the invention according to FIGS. 1 to 4; and FIG. 6 shows a detailed view of the heater, whereby the view of the viewer is oriented along the axial main extension direction of the heater.

DETAILED DESCRIPTION

Figure 1:
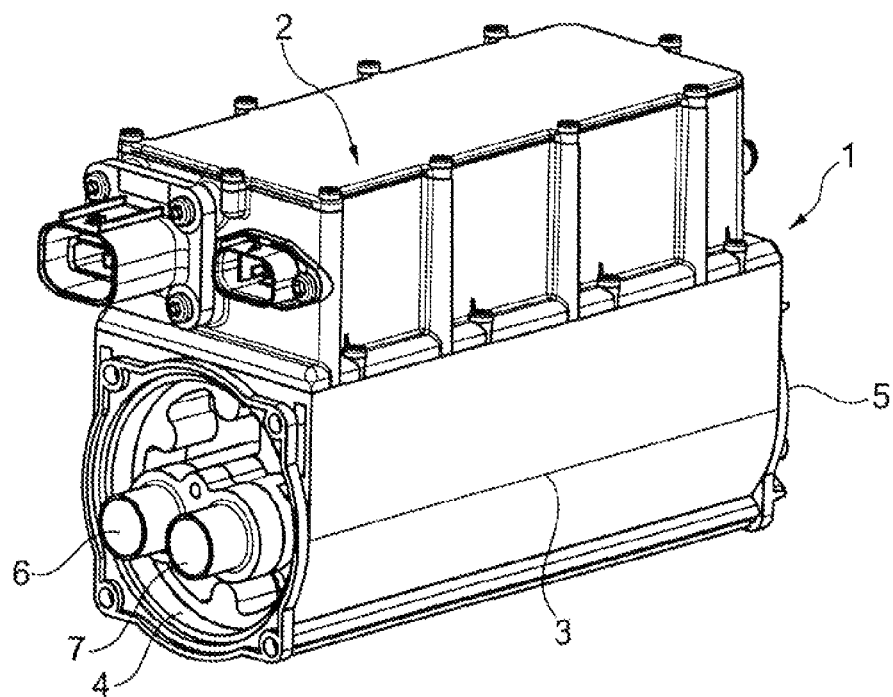
FIG. 1 shows a view of a heater of the invention with a control unit integrated on the housing.

FIG. 1 shows a perspective view of a heater 1. Heater 1 has a housing 3 to which a control unit 2 is connected. Control unit 2 in this case, for example, as shown in FIG. 1, is fastened to housing 3 by screw connections. Housing 3 forms a cylindrical interior space in which the components of heater 1 are integrated. Covers 4, 5, which close housing 3 at the ends in the axial direction, are provided at the axial end regions of housing 3. Cover 4 has a fluid connection 6 and a fluid connection 7, which depending on the flow direction within heater 1 can each be used as a fluid supply or as a fluid discharge. In an alternative embodiment, the coil housing can be configured also as a single part with one of the covers. The coil housing in this case assumes the function of the cover, as a result of which the housing can be closed at ends by the coil housing in at least one axial direction. Sealing elements, such as, for example, O-rings, can be provided on covers 4, 5 or a cover made as a single piece with the coil housing.

Figure 2:
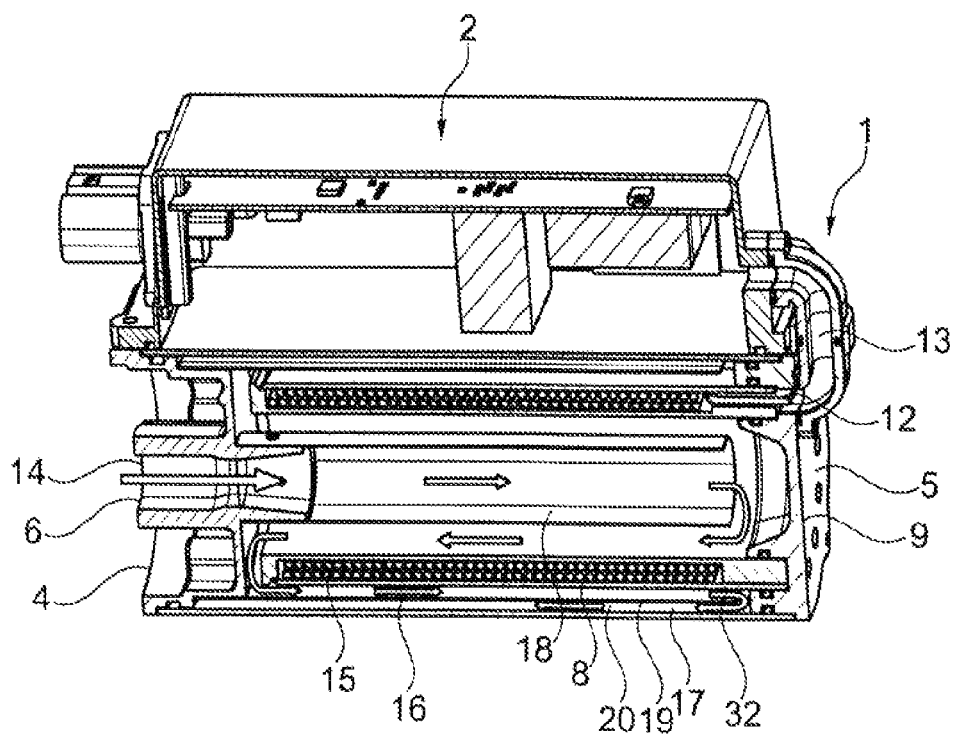
FIG. 2 shows a further view of the heater according to FIG. 1, whereby the heater is illustrated in a partial section, as a result of which the interior of the heater is shown.

FIG. 2 shows a sectional view through heater 1 shown in FIG. 1. In the top area of FIG. 2, control unit 2 is shown which will not be described in greater detail below.

A coil housing 9, made as a single piece or as multiple pieces, is disposed in the interior of housing 3. A space 32, into which a coil 8 is inserted, is provided within coil housing 9. Coil 8 forms a hollow cylindrical body, which is formed from a winding of an electrically conductive material.

Coil 8 is connected via an electrical contact 12 to control unit 2. A connecting region 13, through which electrical contact 12 can be run into control unit 2, is provided outside (optionally also within) of housing 3.

Coil housing 9 in its interior can have, in addition to coil 9, a medium, which, on one hand, encloses coil 8 fluid-tight in the interior of coil housing 9 and, on the other, increases the thermal conductivity within coil housing 9.

A tube 18, which forms a channel 14 through which a fluid can flow, is disposed in the center of coil housing 9. Channel 14 in this case is directly in fluid communication with fluid connection 6. Channels 14, 15, 16, and 17 which follow are in each case the channels of the fluid channel within the heater. For the sake of simplicity, they are each called a channel and, arranged one next to the other form the fluid channel, which leads from the fluid inlet to the fluid outlet of the heater.

Fluid connection 6 in FIG. 2 is formed as a fluid inflow. Accordingly, a fluid can flow through fluid connection 6 along channel 14 into tube 18 and at the end region of tube 18, said region facing away from fluid connection 6, flow into a region between tube 18 and coil housing 9.

Tube 18 in this case is pushed onto a shoulder, which is attached on the interior of cover 4 or fluid connection 6, and there connected to it. The end region of tube 18, facing away from fluid connection 6, is spaced apart from cover 5 in such a way that an air gap arises between tube 18 and cover 5 or closing region of the coil housing, said gap through which a fluid can flow in channel 15, which is formed between tube 18 and coil housing 9. The fluid then flows through channel 15 toward cover 4. Between coil housing 9 and cover 4 an air gap is provided, through which the fluid can finally flow over into a channel 16, which is formed between the coil housing and a flat heating element 19, which is also formed as a hollow cylinder body.

The fluid can then finally flow in the direction of cover 5. An air gap through which the fluid is once again redirected is likewise provided between flat heating element 19 and cover 5 or the closing region of the coil housing. The fluid flows along channel 17 again in the direction of cover 4 between flat heating element 19 and the inner wall of housing 3. A further flat heating element 20 can be provided between flat heating element 19 and the housing inner wall.

Said flat heating element 20 in this case divides channel 17 into two smaller subchannels 17a and 17b between heating element 19 and the inner wall of housing 3. For this purpose, flat heating element 20 may have, for example, alternately exposed areas produced by slots from the cylindrical jacket surface of flat heating element 20. Fluid thereby flows in the same direction both over the side, facing flat heating element 19, and the side facing housing 3, of flat heating element 20. In an alternative embodiment, a flat heating element or some other displacement element, which divides the particular channel into smaller subchannels, can also be introduced into the other channels 14, 15, 16.

The fluid can then flow out of heater 1 over fluid connection 7, not shown in FIG. 2, via radially arranged openings in cover 4.

Coil housing 9 is disposed in the heater in such a way that fluid can flow around it on both sides. This so generated heat within coil 8 can be transported away especially well by the fluid and in addition a heating effect for the fluid can thereby be produced.

Surface-expanding elements such as, for example, swirl elements or turbulence elements can be provided advantageously on the outer surfaces, facing the fluid, of coil housing 9. In this way, the flow of a fluid can be positively influenced in such a way that the heat transfer between the flat heating elements within heater 1 and the fluid is improved.

The elements shown in heater 1, such as tube 18 or flat heating elements 19 and 20, are partially or substantially made of a metallic material, can be heated due to an induction effect. The heat in this case can be transferred to the fluid flowing around the flat heating elements, as a result of which the fluid is heated.

Coil 8, via electrical contacts 12, is preferably provided with a voltage source that passes on an alternating voltage to coil 8. This will create an alternating magnetic field that leads to heating of the metallic elements such as, for example, tube 18 and flat heating elements 19, 20.

Figure 3:
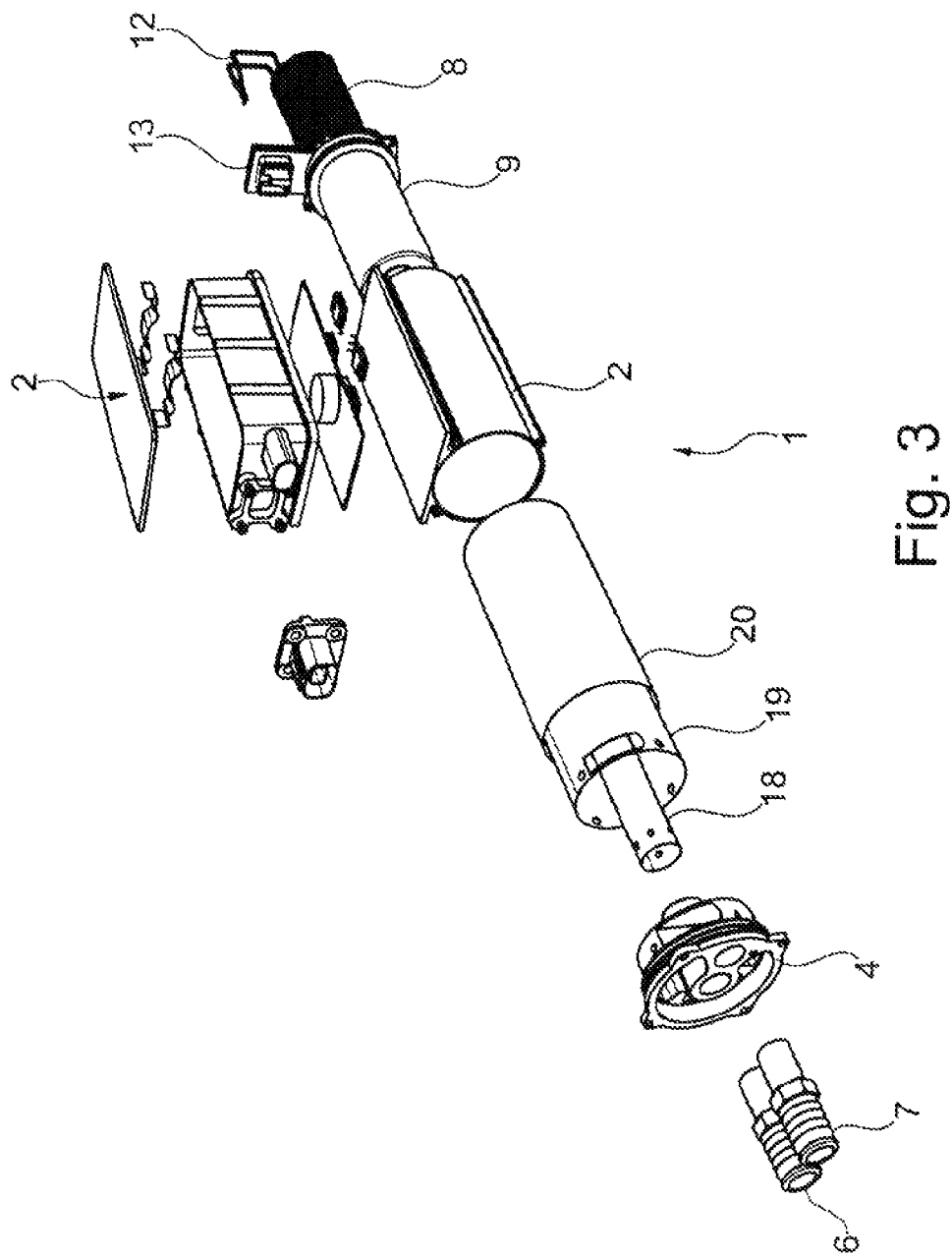
FIG. 3 shows an exploded illustration of the heater of the invention according to FIGS. 1 and 2.

FIG. 3 shows an exploded illustration of heater 1 as it was already shown in FIGS. 1 and 2. It is particularly evident in FIG. 3 how the individual elements of heater 1 are arranged one within the other. Thus, fluid connections 6 or 7 can be inserted in openings of cover 4 and inserted with tube 18 or flat heating element 19 and a flat heating element 20 in housing 2. Coil housing 9 and coil 8 with its electrical contacts 12 can be inserted as it were from the opposite side into housing 2. Control unit 2, which is provided for controlling coil 8, is provided on the top side of housing 3.

This design of coil housing 9 can achieve that coil 8 is completely separated from the fluid flowing through heater 1. An electrical short circuit can be avoided in this way. Further, an advantageous heat transfer from the coil to the fluid is possible by the integration of coil 8 and coil housing 9, around which the fluid flows.

Figure 4:
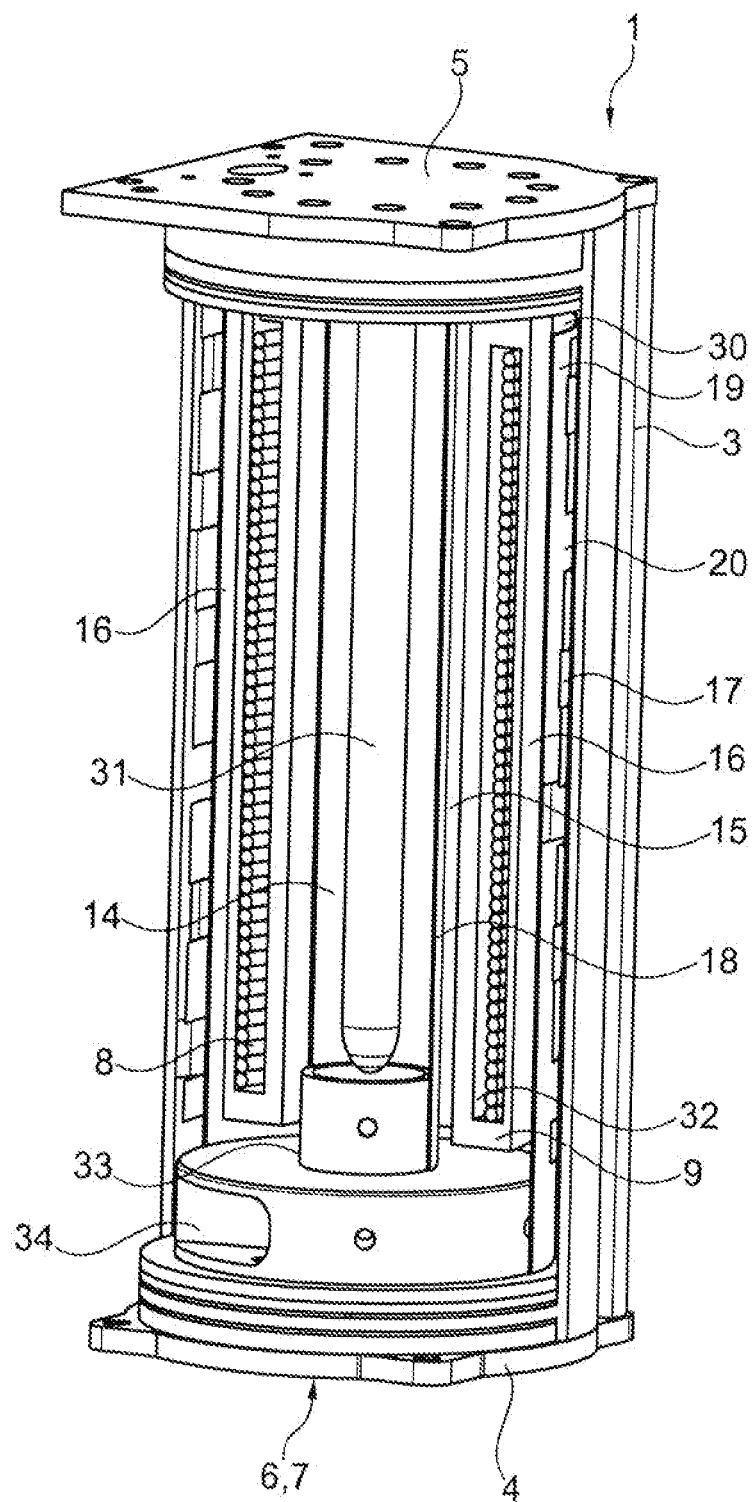
FIG. 4 shows a sectional view of the heater according to FIGS. 1 to 3.

FIG. 4 shows a further schematic view of heater 1.

The magnetic field can be generated within heater 1 by a current feed to coil 8, for example, with an alternating voltage. Both tube 18 and flat heating elements 19, 20 are made of a metallic material.

Tube 18 and flat heating elements 19, 20 can be heated due to the alternating magnetic field generated by coil 8. A fluid, which as it flows past takes up the heat from flat heating elements 19, 20 or tube 18, can flow past both flat heating elements 19, 20 and also tube 18. Tube 18 forms a further heating element.

Flat heating elements 18 and 20 are advantageously formed of a magnetic material. It is possible thereby to contain the alternating magnetic field, generated by coil 8, in its spatial expansion. This is especially advantageous for minimizing as much as possible the effects of the alternating magnetic field outside housing 3. In addition, an interior region, free of an alternating field, can be realized within heater 1 by a tube 18 made of a magnetic material.

The containment of the alternating magnetic field is particularly advantageous to possibly avoid undesirable interactions with adjacent electrical or electronic systems. It is advantageous in addition to eliminate unwanted heating of other metallic materials. Furthermore, by limiting the alternating magnetic field to a concentrated predetermined space, a higher efficiency of heater 1 can be achieved overall, because the losses, arising due to the scattering of the alternating magnetic field, are lower.

In an advantageous embodiment housing 3 can be designed of a nonmetallic or non-electrically conductive or nonmagnetic material such as, for example, a plastic. This applies particularly when the outermost flat heating element 20 is made of a magnetic material. The alternating magnetic field is then already largely contained by flat heating element 20, as a result of which unwanted interactions with neighboring systems and structures are prevented.

Furthermore, channel 14, which arises in the interior of tube 18 between mandrel 31, inserted into tube 18, and the inner wall of tube 18, is shown in FIG. 4. Mandrel 31 can be used to reduce the hydraulic diameter of channel 14. This can be achieved primarily by the geometric design of mandrel 31. The flow properties within heater 1 can be optimized by adjusting the hydraulic diameter.

Further, mandrel 31, particularly at its tip, may have a temperature sensor to acquire the temperature of the fluid, which can flow within heater 1, adjacent to the inflow or outflow site 6, 7 in the region of bottom cover 4.

A radially circumferential air gap for the fluid to flow out of channel 14 is formed between tube 18 and top cover 5 or closing region of the coil housing. A radially circumferential air gap 33 for the fluid to flow from channel 15 into channel 16 is formed between coil housing 9 and bottom cover 4. A radially circumferential air gap 30 for the fluid to flow from channel 16 into channel 17 is formed between flat heating element 19 and top cover 5 or closing region of the coil housing. Lastly, the fluid can flow from channel 17 via a radial channel 34 at a radial peripheral region of a cylindrical section of bottom cover 4 to one of the fluid connections 6, 7 and from there out of heater 1.

FIG. 5 shows a sectional view through heater 1, whereby the section runs along the central axis of central mandrel 31.

In the view of FIG. 5, channels 14, 15, 16, and 17 arising between flat heating elements 18, 19, and 20 can be seen. In FIG. 5, a possible flow through heater 1 is shown by a plurality of arrows. It must be considered in this case that the shown channels 14, 15, 16, and 17 are each formed radially circumferential and ring-shaped. A reversal of the flow direction can also be provided in alternative embodiments.

A countercurrent flow occurs around tube 18, coil housing 9, and flat heating element 19 at their two respective cylindrical jacket surfaces. A co-current flow occurs, in contrast, around flat heating element 20, which divides channel 17 into at least two subchannels 17a and 17b, at its two cylindrical jacket surfaces.

Additional regions surrounded by co-current flow or countercurrent flow can also be created by an alternative design. The design of heater 1, as shown in FIGS. 1 to 5, leads to both fluid inflow 6, 7 and fluid outflow 6, 7 being disposed at the same axial end region of heater 1.

A flat heating element is disposed radially within coil 8 with tube 18 and the two flat heating elements 19, 20 are disposed radially outside coil 8. The distribution of the flat heating elements can also be different depending on the desired output distribution within heater 1. The design of coil 8 as a hollow cylindrical unit results in an especially strong alternating magnetic field, particularly radially within coil 8.

FIG. 6 shows a partial view of the heater, with the view being oriented along the central axis of mandrel 31. The arrangement of the individual channels 14, 15, 16, and 17 between flat heating elements 18, 19, and 20 and coil housing 9 is evident. As already indicated above, the hydraulic diameter of channels 14, 15, 16, and 17 can be adjusted by the insertion of displacement elements, such as, for instance, mandrel 31. The flow through the heater can be optimized as a result.

In the view of FIG. 6, the structure of flat heating element 20 in particular is evident. A plurality of sections are deflected both radially outward and radially inward from a cylindrical surface, which results in a wave-like structure. Flat heating element 20 with the individual deflected sections abuts both the outer surface of flat heating element 19 and the inner surface of housing 3.

Several subchannels, through which a fluid can flow, arise within channels 17 because of the individual deflected sections. The design of flat heating element 20 can influence the hydraulic diameter of channel 17 and therefore the flow properties within channel 17.

Advantageously, the innermost flat heating element 18 is made of a ferritic material, whereby the middle flat heating element 19 is of an austenitic material and the outermost flat heating element 20 of a ferritic material.

Depending on the arrangement, a portion of the total heat output of 20% to 40% is generated by inner flat heating element 18, a portion of 50% to 70% by middle flat heating element 19, and a portion of 5% to 15% by outer flat heating element 20. The ferritic materials are suitable to contain the alternating magnetic field of coil 8.

The heat output of such a heater 1 varies advantageously within a range of 3 kW to 7 kW. In this case, flat heating elements 18, 19, 20 preferably have a heat-transferring surface of approximately 10 $dm^2$ to 25 $dm^2$. The material thickness of flat heating elements 18, 19, 20 is advantageously 0.08 mm to 0.5 mm, thereby preferably 0.3 mm. A preferred material is a steel material.

Advantageously, housing 3 is made of an aluminum material and has a material thickness of 1.5 mm to 3 mm, thereby preferably 2 mm.

Mandrel 31 in an advantageous embodiment has a diameter of 6 mm to 15 mm, thereby preferably 10 mm.

Channel 14 is preferably 4 mm to 10 mm wide, thereby approximately 7 mm. The hydraulic diameter of channel 14 is approximately 8 mm to 20 mm, preferably 14 mm.

Channel 15 is preferably 3 mm to 7 mm wide, thereby approximately 5 mm. The hydraulic diameter of channel 15 is approximately 6 mm to 14 mm, preferably 10 mm.

Channel 16 is preferably 2 mm to 6 mm wide, thereby approximately 4 mm. The hydraulic diameter of channel 16 is approximately 4 mm to 12 mm, preferably 8 mm.

Channel 17 with inserted flat heating element 20 is divided in two subchannels 17a, 17b. One of the subchannels is 0 mm to 6 mm wide, preferably 4 mm wide, and has a hydraulic diameter of 0 mm to 12 mm, preferably 8 mm. The other subchannel is 0 mm to 4 mm wide, thereby preferably approximately 2 mm wide, and has a hydraulic diameter between 0 mm and 8 mm to, thereby preferably approximately 4 mm. The values for the hydraulic diameter refer here to a non-profiled flat heating element 20.

The described sizes refer to a special design of a heater. Dimensions beyond these and departing therefrom are also conceivable in alternative embodiments.

Alternatively to the above-described exemplary embodiments, both first channel 14, 15 and/or second channel 16, 17 can also be configured as a single piece without the interconnection of a wall. Alternatively, the wall can lie directly against housing 3 or coil housing 9. As a result, especially the outermost channel and/or also the innermost channel can also be configured without an intermediate wall of a flat heating element 18, 19, 20. The flat heating element then lies preferably directly against housing 3 or coil housing 9 or another flat heating element or another wall.

The design of the flat heating elements, when the outer flat heating element and the middle flat heating element adjoin each other, can be such that the two flat heating elements lie against one another and are connected together or they are formed as bimetal or otherwise as surface composite.

The outer flat heating element can be configured perforated and/or wavy and thereby lie with the entire surface and/or point-like against the wall of housing 3 or the outer wall of the middle flat heating element.

The embodiments in FIGS. 1 to 6 are exemplary and serve to clarify the inventive concept. They are not limiting in nature. Individual features of the exemplary embodiments can be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heater comprising:
   a housing with a fluid channel arranged within the housing;
   a fluid inlet;
   a fluid outlet;
   a coil that generates an alternating magnetic field and is separately sealed from the fluid channel by a coil housing that is provided in the housing; and
   at least one metallic heating element that is heated by the alternating magnetic field, the at least one metallic heating element being arranged in the fluid channel;
   wherein walls bounding the fluid channel are formed by the coil housing and/or by the at least one metallic heating element,
   wherein the at least one metallic heating element includes a first heating element, a second heating element, and a third heating element,
   wherein the fluid channel is divided by the first, second and third heating elements into a first channel, a second channel, a third channel, and a fourth channel,
   wherein the fourth channel is divided into two subchannels by the third heating element, and
   wherein the first heating element is arranged radially within the coil and the second heating element and the third heating element are arranged radially outside the coil.

2. The heater according to claim 1, wherein the fluid channel and/or the first channel, the second channel, the third channel and the fourth channel are configured ring-shaped, and wherein the coil housing and/or the at least one metallic heating element are each configured as a hollow cylinder and have diameters different from one another.

3. The heater according to claim 2, wherein the at least one metallic heating element and/or the coil and/or the coil housing are arranged concentrically to one another.

4. The heater according to claim 1, wherein a fluid flows through the first channel, the second channel, the third channel and the fourth channel in a co-current flow or in a countercurrent flow.

5. The heater according to claim 1, wherein at least one of the first heating element or the third heating element is formed of a magnetic material.

6. The heater according to claim 1, wherein the third heating element is insertable in the fourth channel.

7. The heater according to claim 6, wherein a co-current flow flows around the third heating element dividing the fourth channel into the two subchannels.

8. The heater according to claim 1, wherein the at least one metallic heating element and/or the coil housing have swirl elements and/or turbulence elements on a surface thereof around which fluid flows.

9. The heater according to claim 1, wherein the at least one metallic heating element is made of a material that has a higher resistivity than a material of the coil.

10. The heater according to claim 1, wherein one of the first heat element, second heating element or third heating element has at least one opening through which a fluid transfer between channels adjacent to one another is realizable.

11. The heater according to claim 1, wherein an element for regulating the hydraulic diameter of the fluid channel is insertable in the first channel.

12. The heater according to claim 1, wherein a temperature sensor is arranged within or outside the coil housing.

13. The heater according to claim 1, wherein the pressure loss in channels adjacent to one another increases or decreases with an increasing flow path length within the heater.

14. The heater according to claim 1, wherein the pressure loss in channels adjacent to one another increases continuously with an increasing flow path length within the heater.

15. The heater according to claim 1, wherein the coil housing and each of the first heating element, the second heating element and the third heating element are configured as a hollow cylinder and each have diameters different from one another.

16. The heater according to claim 1, wherein the coil housing is configured as a cylinder having a hollow core, and wherein the fluid inlet directly connects to the first channel, the first channel being provided inside of the hollow core of the coil housing.

17. The heater according to claim 1, wherein the first heating element and the third heating element are each formed of a magnetic material.

* * * * *